United States Patent

Linnell

[11] Patent Number: 5,833,114
[45] Date of Patent: Nov. 10, 1998

[54] CONTAINERS

[75] Inventor: Michael Charles Linnell, 75 River Road, Barking, Essex, Great Britain, IG11 0DR

[73] Assignees: Michael Charles Linnell; Linda Rose Linnell, both of Barking; Michael Charles Linnell, Jr.; Sharon Ann Manning, both of Hornchurch, all of Great Britain

[21] Appl. No.: 793,872
[22] PCT Filed: Sep. 8, 1995
[86] PCT No.: PCT/GB95/02154
  § 371 Date: Jul. 7, 1997
  § 102(e) Date: Jul. 7, 1997
[87] PCT Pub. No.: WO96/07578
  PCT Pub. Date: Mar. 14, 1996

[30] Foreign Application Priority Data

Sep. 8, 1994 [GB] United Kingdom .................... 9418123

[51] Int. Cl.[6] ........................................................ B62B 3/00
[52] U.S. Cl. ................................. 220/531; 220/1.5; 220/6
[58] Field of Search .................................. 220/505, 502, 220/531, 1.5, 6

[56] References Cited

U.S. PATENT DOCUMENTS

| 529,230 | 11/1894 | Zimmerman | 220/531 X |
| 2,564,940 | 8/1951 | Weber | 220/1.5 X |

FOREIGN PATENT DOCUMENTS

| 0261012 | 3/1988 | European Pat. Off. . |
| 2659938 | 9/1991 | France . |
| 0470862 | 4/1969 | Switzerland . |
| 1342895 | 1/1974 | United Kingdom . |
| 1460583 | 1/1977 | United Kingdom . |
| 1522774 | 8/1978 | United Kingdom . |
| WO 91/12999 | 5/1991 | WIPO . |

Primary Examiner—Steven M. Pollard
Attorney, Agent, or Firm—Townsend and Townsend and Crew LLP

[57] ABSTRACT

A container for the secure storage and transport of items, has a rigid rectangular base with rigid side walls upstanding from opposed edges thereof, a rigid back wall extending generally normally of the base wall between the side walls (preferably centrally of the base) and partition walls pivotally connected along one edge to the back wall. Each partition wall is foldable so that it is held against or parallel to the back wall and extendable from the back wall to be supported on runners on the side walls. The base and each partition wall has a front wall pivotally connected to its edge spaced from the back wall and when the partition walls are extended these front walls are each movable to extend upwardly between the side walls from its associated partition wall to the one thereabove.

16 Claims, 2 Drawing Sheets

CONTAINERS

TECHNICAL FIELD

The invention relates to containers and in particular containers for the secure storage and transport of items.

BACKGROUND ART

There is need for the secure storage and transportation of postal items within and between sorting offices after those items have been sorted.

There is also need for the secure storage and transportation of items within a commercial or industrial environment—for example within an office block where items may need to be delivered to and collected from various departments or in a factory in which various parts may be taken to and collected from different places within a building or complex of buildings.

Within a commercial environment such as a shop or store there is often need for the secure storage and transportation of relatively small but high value items (e.g. records, tapes and the like) from a storeroom to a display case or shelf.

Each of these needs requires that any container used for the storage and transportation of the items must be readily movable, must allow the easy placement of items within, and removal of items from, the container, furthermore, (in view of the variety of sizes of different items that may on occasion need to be transported) the container should be readily adaptable to carry items of different size. Again, the container should be readily securable against unauthorised access to items therein.

Generally within the UK postal system mail is carried between offices in fabric bags or sacks. More recently proposals have been made that the mail be carried between offices in rigid trays.

Transport of items within a commercial environment is usually effected by means of rigid trolleys with a number of separate open shelves of fixed spacing in which items are placed for delivery or after collection. Such trolleys are usually heavy and of significant size. Items placed on them are not secure.

EP-A-0261012 discloses a container for the secure transportation of items including a plurality of sets of elements manipulatable between folded and extended positions. When extended the sets of elements form a series of shelves or trays in vertical register. The sets of elements may be folded to allow access to a base of the container and then successively extended, as items are placed on the shelves. When all the required items have been placed on the shelves a door is closed to close all the shelves and secure the items in the container. Such an arrangement, whilst protecting the items once the container has been filled and the door closed does not protect those items when the container is only partially filled.

An object of the invention is to provide a container which meets the noted needs and which, moreover, alleviates and/or overcomes the disadvantages seen in the prior art.

DISCLOSURE OF THE INVENTION

Accordingly the invention provides a container for the secure storage and transportation of items which comprises a plurality of sets of elements carried above a base and manipulable between folded and extended positions in which they form with the base a series of trays in vertical register, each set of elements being foldable to allow access to a bottom tray formed by the base and being successively extendable to form said series of trays, and which is characterised in that the bottom tray is closable by a wall pivotally coupled to the edge of the base and in that each other tray is closable by a wall pivotally coupled to and forming part of said set of elements.

The container may comprise a rigid rectangular base wall with rigid side walls upstanding from opposed edges thereof, a rigid back wall extending generally normally of the base wall between said side walls, and a plurality of partition walls each pivotally connected along one edge to the back wall, each partition wall being movable between a folded position which is held against or parallel to the back wall and an extended position in which it extends away from the back wall and is supported by elements carried on the side walls, wherein the base wall and each partition wall has pivotally connected thereto a front wall which when the partition walls are extended is rotatable between a position in which it lies parallel to its associated base or partition wall and a position in which it extends normally thereof between said side walls, one or more of said front walls being sized to extend from its associated wall to the next adjacent partition wall.

Each front wall save that furthest from the base wall may be sized to extend from its associated wall to the next adjacent partition wall when said partition walls are extended.

Desirably, said front walls are pivotally connected to the edge of the base wall, and to the edges of the partition walls when extended, spaced from the back wall.

The container may further include a top wall pivotally connected to the upper edge of said back wall and movable to a position in which it may rest upon the upper edge of the front wall furthest from the base wall.

In an embodiment of the invention the back wall is located centrally of the base wall, a plurality of partition walls and a top wall being carried on each major surface thereof.

The spacings of the extended partition walls from one another and from the base wall may vary.

A container embodying the invention may further include a number of rigid divider walls each pivotally connected to the back wall and movable between a position in which it is held against or parallel to the back wall and a position in which, when the partition walls are extended, is in a plane lying substantially parallel to the planes of the side walls.

Advantageously, each partition wall comprises two or more rigid wall parts which are hingeably connected.

The container preferably further includes means enabling the releasable attachment of the walls and/or wall parts one to another and to other elements of the device.

Said releasable attachment means may comprise magnetic catches, or cooperating patches of velcro, carried on said walls and/or wall parts and other elements of the device.

The container may also include means for enabling the releasable fixing of said front walls and the or each said top wall one to the other.

This releasable fixing means may comprise a plurality of elements formed on faces of the front walls and the outer edge of the or each top wall through which a securing element or elements is passable.

Advantageously, the base wall carries, on the face thereof opposed to said back wall a plurality of wheels.

Movement of the container may be eased by providing a handle on the or each side wall.

The above and other aspects, features and advantages of the arrangement will become more apparent from the following description of embodiments of the invention now made with reference to the accompanying drawings in which:

BRIEF DESCRIPTION OF THE DRAWINGS

FIG. 1A is a detail view showing means for securing the container of FIG. 1,

MODES OF CARRYING OUT THE INVENTION

Figure 1:
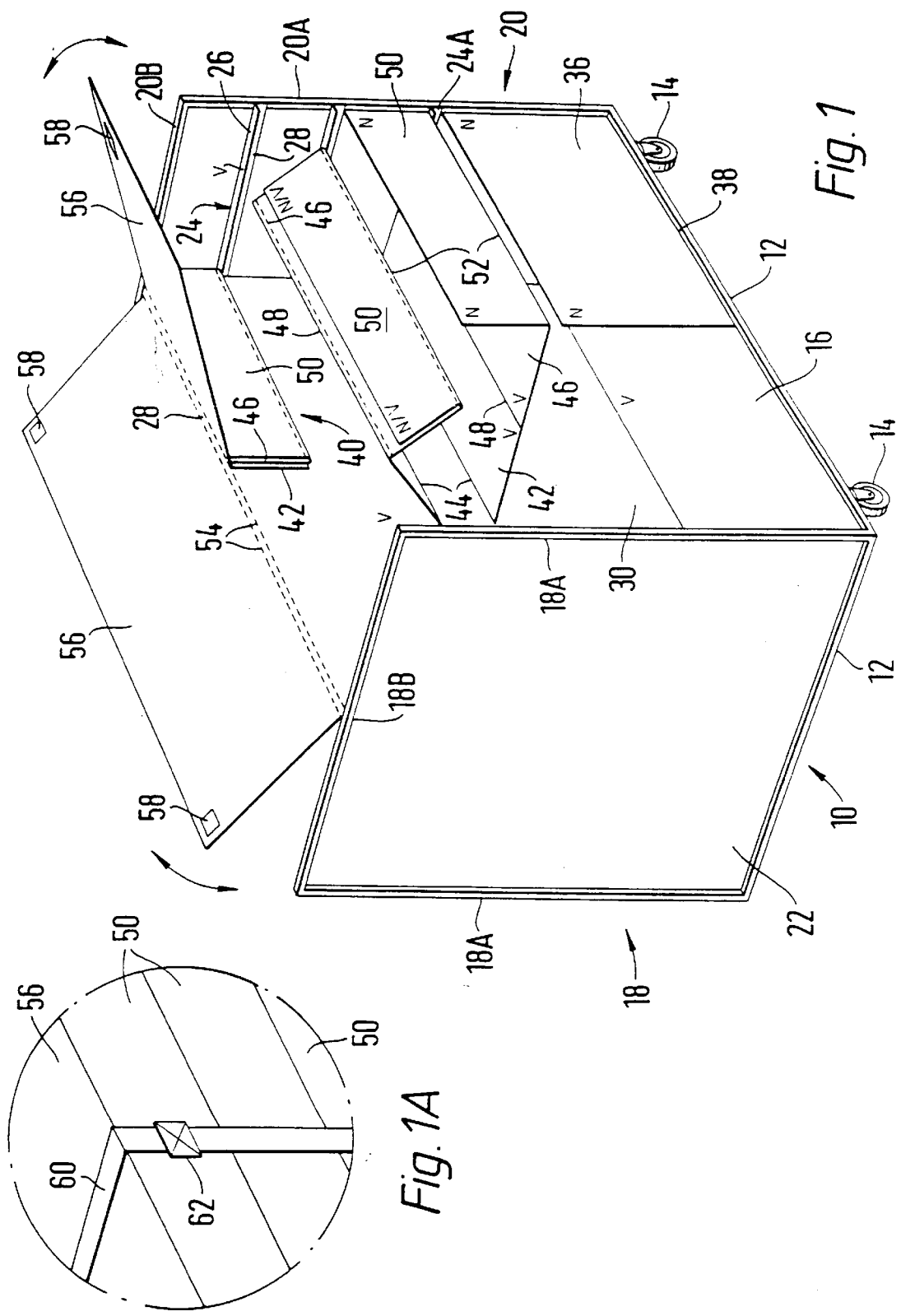
FIG. 1 illustrates a first container embodying the invention.

FIG. 1 shows a first container embodying the invention to comprise a rectangular base wall 10 comprising an outer framework of metals tubes 12 the four corners of which are provided with castor wheels 14 as shown. The base wall 10 is completed by a flat sheet 16 as indicated.

The container further comprises side walls 18 and 20 on opposed edges of the base wall 10. Each side wall is formed of a pair of upstanding side support posts 18A and 20A as shown which extend generally normally of the plane of the base wall 10 and are joined, at their upper ends, by side support bars 18B and 20B as shown.

The side walls 18 and 20 are completed by rigid sheets 22 which, as shown, extend between base tubes 12, the side support posts 18A and 20A and the side support bars 18B and 20B as shown.

The sheets 16 and 22 may be of any suitable material, for example metal, plastics, wood or a composite such as plywood.

Carried on the inner surfaces of the sheets 22 are a series of metal runners 24 each of which is generally L-shaped in section as shown having an upper, generally horizontal, surface 26 and a depending, generally vertical, surface 28 fixed to a sheet 22.

The lowermost runners 24A are spaced above the base wall 10 of the container by an amount greater than the spacing of the other runners.

To add rigidity to the container a cross bar 28 is provided extending between and attached to the mid points of the side support bars 18B and 20B.

The container further comprises a rigid back wall 30 extending generally centrally across the base 10 and between the side walls 18 and 20 with its upper edge connected to or forming the cross bar 28.

The base wall 10, side walls 18 and 20, the back wall 30 and the cross bar 28 are all rigidly interconnected.

If desired the side support bars 18B and 20B may be provided with one or more handles (not shown) to ease movement of the device and further, if desired, the castor wheels 14 may be provided with brakes (again not shown).

The container is further provided with base front walls 36 (only one of which can be seen) hingeably connected, as shown at 38, to the edges of the base wall 10 spaced from the back wall 30.

The viewable base front wall 36 is shown partially broken away to ease intelligibility of the Figure.

Each of the base front walls 36 may be rotated about its hinged connection 38 from a position in which it lies on base wall 10 to a position in which it upstands from the base wall 10 and is supported by the side support posts 18A and 20A as shown.

It is to be noted that the base front walls 36 are sized such that when rotated to extend normally of base wall 10 they extend laterally the full distance between the sheets 22 of the side walls 18 and 20 and vertically to the level of the runners 24 thereabove.

The container further comprises a plurality of partition walls shown generally at 40 attached to opposite sides of the back wall 30. Again to ease intelligibility of the Figure the viewable partition walls 40 as shown partially broken away. Each partition wall comprises a group of wall parts a first one of which is shown at 42 to have one edge hingeably connected at 44 to the back wall 30 of the container.

The edge of the partition wall part 42 spaced from hinge 44 carries a second partition wall part 46 hingeably connected with the first partition wall part 42 at 48.

Figure 2:
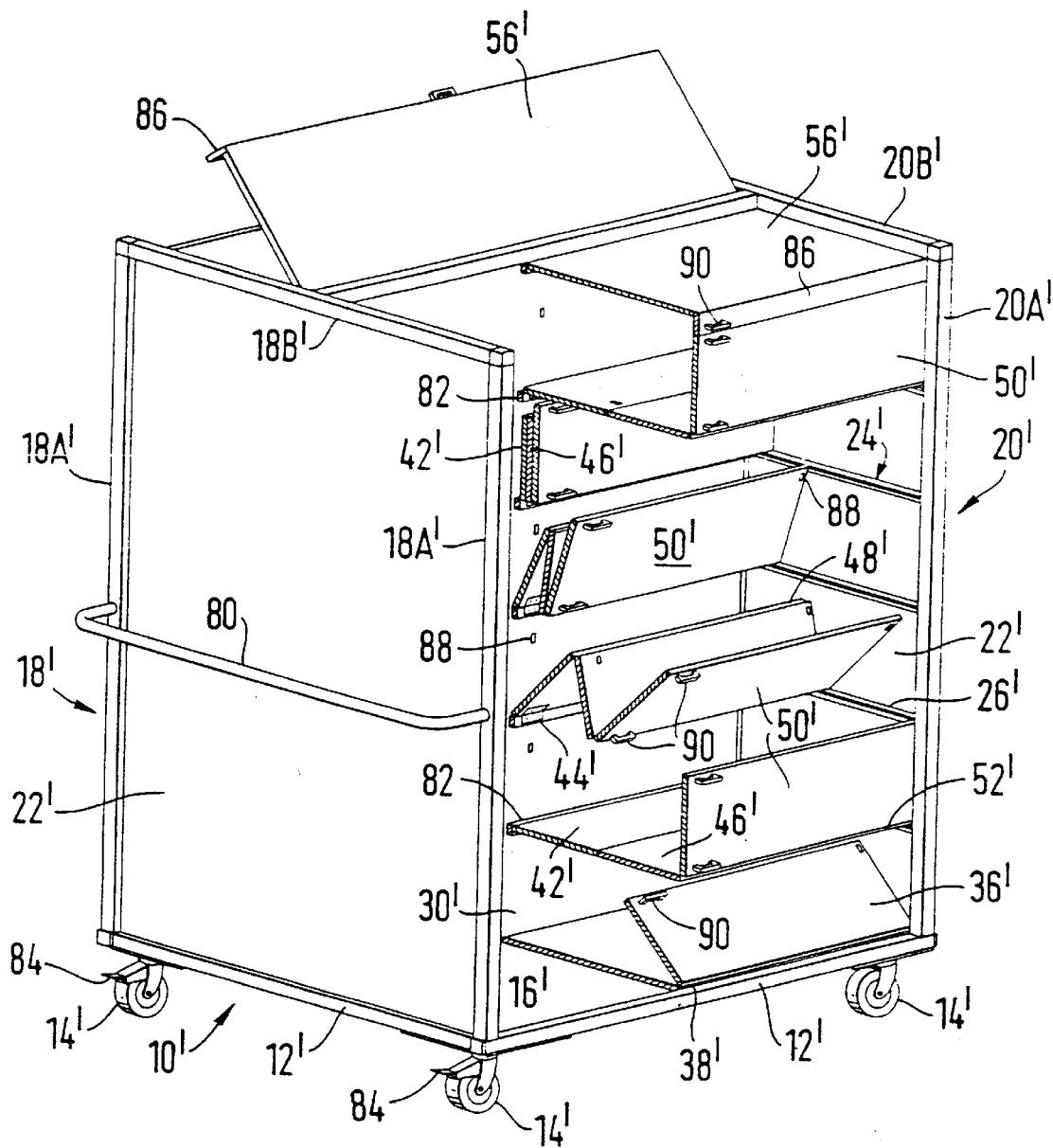
FIG. 2 illustrates a second container embodying the invention.

Each group of wall parts 40 is completed by a partition front wall part 50 which, as can be seen from FIG. 2, is hingeably connected at 52 to the free edge of the second partition wall part 46.

The cross bar 28 has hingeably connected to it at 54 two top walls 56, each of which is rotatable from a position extending vertically to a position overlying and resting upon the side walls 18 and 20. Catches 58 are provided for holding the top walls 56 vertically.

Once again, one of the top walls 56 has been partially broken away to ease intelligibility of the Figure.

It will be seen from the above description that the various partition wall parts may be folded (as indicated in the upper part of FIG. 1) against the back wall 30 or may be extended (generally as shown in the lower parts of the Figure) such that the partition wall parts are supported on the runners 24 with the partition front wall parts 50 upstanding and extending laterally between the side walls 18 and 20. It will again be seen that the partition front wall parts 50 are sized such that they extend vertically, when upstanding from their associated partition walls 40, to the level of the runners 24 thereabove.

In order that the base front wall part 36 and the partition walls will be held in their folded and extended positions—as illustrated in the Figure—any suitable form of clip, catch or the like may be used.

In the arrangement shown in FIG. 1 the means enabling the releasable attachment of the various parts one to the other such that the partition walls may be held folded is provided by velcro strips or patches which are applied (making use of double sided adhesive tape) to parts of the container; strips being applied to the surfaces 26 of runners 24. Those areas of the viewable, in FIG. 1, surfaces of elements of the container to which velcro patches are applied are indicated by the letter V whilst the letter N indicates where velcro patches have been applied to the unseen surfaces of elements of the container.

As noted the purpose of the Velcro patches applied to the elements of the device and shown in the Figure is two-fold; firstly, the patches enable the elements of the container to be folded against one another and the back wall 30; and secondly, the patches will, as will be described in more detail below, enable the container elements to be securely supported on the runners 24 and against the support posts 18 and 20 when the partition walls 40 are extended.

The partition wall parts are hingeably connected to the back wall 30 enabling ready access to be made to various areas of the container when placing items for transport or storage in the device.

It is possible, for example, for all the partition wall parts to be rotated about their hinge connections to bring them into positions, folded against the back wall 30, in which positions they allow ready access to the base wall 10 of the container—so permitting items to be readily placed on or lifted from the base 10.

If it is assumed that items are to be placed in an otherwise empty container embodying the invention then the parts of each group of wall parts 40 are folded against each other and against the back wall 30 and the top walls 50 are rotated to extend vertically in which position they are held by the catches 58.

From this position the base front wall part 36 is rotated about the axis of hinge 38 to bring it to an upright position (as shown) extending between the side supports 18 and 20. The base front wall part 36 is held in the position shown by co-operating patches of velcro provided along the edges of its outer face and on the faces of the side support bars 18A and 20A against which it is brought to bear.

A user may then place items on the base 10 of the container.

Once sufficient items have been placed on the base wall 10 the lowermost group of partition wall parts are then manipulated to form a tray lying generally parallel to the base wall 10. The tray is formed in the following way.

First the partition wall part 46 is pulled away from the partition wall part 42 such that co-operating velcro patches provided thereon disengage from one another.

Partition wall part 42 is thereafter disengaged from the back wall 30 and the two wall parts are rotated about the hinge axes 44 and 48 such that their outermost edges lie on the surfaces 26 of the runners 24 next above the base wall 10. The velcro patches provided on the edges of the "lower" surfaces of the partition wall parts 42 and 46 engage the velcro strips on the surfaces 26 of the runners 24 and hold these wall parts in position.

Thereafter the partition front wall part 50 is disengaged from its contact with the partition wall 46 and rotated about the axis of hinge 52 until the velcro patches on the edges of its outer face it carries engage velcro patches provided on the side support posts 18A and 20A.

This completes the formation of a tray in the container lying above base wall 10.

It will be appreciated that items may readily be placed on this tray by a user.

The same sequence of operations is followed until each of the partitions have been rotated away from the back wall 30 to form trays and items have been placed in each of those trays.

Once the container has been filled in this way the catches 58 are released allowing the top walls 56 to be rotated to positions in which they overlie and contact the upper edges of the side walls 18 and 20 and the upper edge of partition front wall part 50 of the uppermost partition in the container—that furthest from the base wall 10.

It will be seen that when the various parts of the container are in the positions thus described the container is capable of being secured against unauthorised access to any of the items carried in it.

As soon as the various parts of the container have been positioned as described a user may effectively seal the container by running a tape 60 about it (see detail FIG. 1A) between pairs of castor wheels and in a plane generally parallel to side walls 18 and 20. He can then, if he wishes, apply a seal 62 to the tape 60 to ensure no unauthorised access can be obtained to items within the container without that fact being immediately noticeable.

Items placed in the container may in this way be securely stored and may be transported by simply pushing the container and rolling it on its castor wheels.

The removal of items from the containers is as follows. After breaking the seal 62 and removing the tape 60 run around the container, the top walls 56 are moved to extend vertically, allowing access to the uppermost tray of the container.

The uppermost tray is emptied of items and then the uppermost partition wall parts are moved out of the way—folded against one another and the back wall 30—enabling access to be made to the tray immediately beneath it.

The first and second partition wall parts 42 and 46 are rotated above their common hinge axes 48 and about hinge axes 44 bringing partition wall part 42 into contact with back wall 30 and bringing partition wall parts 42 and 46 into contact with each other and in a position in which they lie parallel to the back wall.

The partition wall part 42 is held on the back wall 30 by co-operating velcro patches and the second partition wall part 46 is held on the first partition wall part 42 by similar velcro patches.

The partition front wall 50 is then folded about its hinge axes 52 to bring it into contact with the surface of the partition wall part 46 where it is again held in position, substantially parallel to the back wall 30, by co-operating velcro patches provided on the facing surfaces of the front wall parts and the partition wall part 46.

This allows access to the next lower tray of the container and the items carried thereon. Once this tray has been emptied the above described sequence of operations may be repeated allowing access to be made to the next lower tray of the container. Similar operations will eventually allow access to the base wall 10 of the container and the items thereon.

It is preferred that the container shown in FIG. 1, if for use in an industrial environment, e.g. for example in a factory, be formed wholly of metal parts. That is to say the base wall 10 and sheets 22 of the side walls 18 and 20 and the various parts of partition walls are preferably of steel plate.

In this arrangement the runners 24 are held on the sheets 22 by welding their flanges 28 onto those sheets.

If desired the described container further includes a number of rigid divider walls (not shown) each associated with a group 40 of partition wall parts and each pivotally connected to the back wall 30. The divider walls are movable between a position in which they are held against the back wall 30 beneath the partition wall parts 40 when they are folded, and a position in which, when the partition walls are extended, is in a plane lying substantially parallel to the planes of the side walls.

In this way the trays formed in the container may be subdivided by a user, if desired.

FIG. 2 illustrates another form of the container embodying the invention for use in a commercial environment—an office or store.

Parts common to the container of FIG. 2 and FIG. 1 are given the same reference numerals distinguished by a prime.

The differences between the container shown in FIGS. 1 and 2 are firstly that the sheet 16' of the base 10', the sheets 22' of the side walls, the parts of the partition wall groups 40 and top walls 56' are all of plywood which is polyurethane coated.

Each of the trays formed by the base wall and the partition wall parts when they are extended is of the same height— that is to say the front wall parts 36', 50' attached to the base wall 10' and the partition walls are all of the same dimensions.

The container shown in FIG. 2 is provided with metal handles 80 fixed to the side support posts 18A', 20A' and the runners 24' comprise wooden strips fixed by screws and/or glue to the sheets 22' forming the side walls of the container.

The partition wall parts are hinged at 42' to hinge support bars 82 screwed and/or glued to the back wall 30. The castors 14' on which the container is supported are fitted with brakes as shown at 84.

Figure 2A:
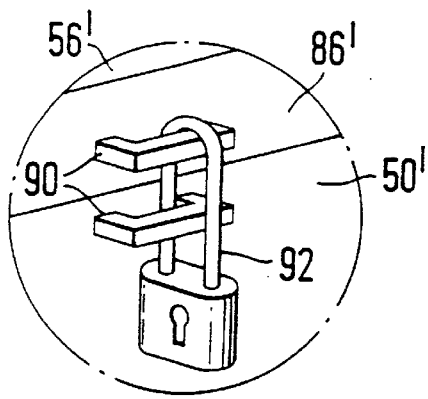
FIG. 2A is a detail view showing means for securing the container of FIG. 2.

It is to be noted also that top walls 56' are fitted with returns 86 which, when the uppermost partition front walls 50' extend vertically, meet the upper edges of those front walls in register as shown (see detail FIG. 2A).

The velcro patches used in the arrangement of FIG. 1 have been omitted and various parts of the container shown in FIG. 2 are held folded or extended by magnetic catches indicated generally at 88.

The top wall returns 86 are provided with open loop handles 90 and each partition front wall 50' is provided with two similar handles 90 one adjacent the top and one adjacent the bottom of the front wall part when the front wall part extends vertically. As can be seen the base front wall 36' is further provided with a handle 90 adjacent its free edge.

It is provided that each of the handles 90, carried on the top wall return 86, partition front wall 50' and the base wall 36' are in vertical register when the front walls extend vertically (as viewed in FIG. 2) and the top wall 50' is closed.

The handles 90 ease manipulation of the top wall 56', the partition front walls 50' and the base front wall 36' when folding and extending the trays which together form the container.

The handles also enable the secure fixture of the parts one to the other to prevent access being made to items held within the container. This may be achieved by providing separate padlocks 92 which can loop through the loops of handles 90 when they are in register and adjacent one another (see detail FIG. 2A, which is shows the handles 90 on top wall 56' and the uppermost of the partition front wall 50').

The container may alternatively be secured, if desired, by passing a tape through all the handles 90 or by making use of a locking bar which may be passed vertically through all the handles 90 when it is desired to secure the container.

It is possible also that cabinet locks may be provided let into the material forming the returns 86, the partition from walls 50' and the base front wall 36'.

Each of the described containers is provided with a centrally located back wall 30, 30' as this is a particularly useful arrangement allowing placement of items into both sides of the container, by different individuals, at the same time. If desired the two sides may be filled sequentially and in some forms of the container the back wall 30, 30' may be formed at an edge of the base wall 10, 10' running between the side walls 18 (18') and 20 (20').

It will be seen that where security is not an issue, the containers described may be used to carry items which are larger than the spacings between extended partition walls, and the base wall. An item may simply be placed on the base wall 10, 10' and the partition walls thereabove maintained folded against the back wall 30, 30'.

INDUSTRIAL APPLICABILITY

It will be appreciated from the forgoing description that the described containers may be used to enable the ready storage of items on the various trays formed by the partition walls as they are released from their (folded) positions in which they lie parallel to the back wall. Furthermore, the side walls and partition front walls act to retain any items placed on the trays which are formed.

It will be appreciated that the various trays provided within the containers can vary in depth if they are intended for a particular use. For example trays may be sized to accept standard postal trays or items of the merchandise which are to be sold. The trays may be sized for example to accept audio or video tapes, records or compact discs or any particular items.

Containers embodying the invention may be used to store safely, whilst commercial premises such as a shop is closed, high value items normally on open display.

Various modifications may be made to the described arrangements without departing from the scope of the invention.

I claim:

1. A container for the secure storage and transportation of items comprises a plurality of sets of elements carried above a base and manipulable between folded and extended positions in which they form with the base a series of trays in vertical register, each set of elements being foldable to allow access to a bottom tray formed by the base and being successively extendable to from said series of trays, characterized in that the bottom tray is closable by a wall pivotally coupled to the edge of the base and in that each other tray is closable by a wall pivotally coupled to and forming of said set of elements.

2. A container as claimed in claim 1, comprising a rigid rectangular base wall with rigid side walls upstanding from opposed edges thereof, a rigid back wall extending generally normally of the base wall between said side walls, and a plurality of partition walls each pivotally connected along one edge to the back wall, each partition wall being movable between a folded position which is held against or parallel to the back wall and an extended position in which it extends away from the back wall and is supported by elements carried on the side walls, wherein the base wall and each partition wall has pivotally connected thereto a front wall which when the partition walls are extended is rotatable between a position in which it lies parallel to its associated base or partition wall and a position in which it extends normally thereof between said side walls, one or more of said front walls being sized to extend from its associated wall to the next adjacent partition wall.

3. A container as claimed in claim 2, wherein each front wall save that furthest from the base wall is sized to extend from its associated wall to the next adjacent partition wall when said partition walls are extended.

4. A container as claimed in claim 2, wherein said front walls are pivotally connected to the edge of the base wall, and to respective edges of the partition walls when extended, spaced from the back wall.

5. A container as claimed in claim 2, further including a top wall pivotally connected to the upper edge of said back wall and movable to a position in which it may rest upon the upper edge of the front wall furthest from the base wall.

6. A container as claimed in claim 2, wherein said back wall is located centrally of the base wall, a plurality of partition walls and a top wall being carried on each major surface thereof.

7. A container as claimed in claim 2, wherein the spacings of the extended partition walls from one another and from the base wall vary.

8. A container as claimed in claim 2, further including a number of rigid divider walls each pivotally connected to the back wall and movable between a position in which it is held against or parallel to the back wall and a position in which, when the partition walls are extended, is in a plane lying substantially parallel to the planes of the side walls.

9. A container as claimed in claim 2, wherein each partition wall comprises two or more rigid wall parts which are hingeably connected.

10. A container as claimed in claim 2, further including means enabling the releasable attachment of the walls and/or wall parts one to another and to other elements of the device.

11. A container as claimed in claim 10, wherein said releasable attachment means comprise magnetic catches carried on said walls and/or wall parts and other elements of the device.

12. A container as claimed in claim 10, wherein said releasable attachment means comprises patches of velcro placed on said walls and/or wall parts and other elements of the device.

13. A container as claimed in claim 2, further including means for enabling the releasable fixing of said front walls and the or each said top wall one to the other.

14. A container as claimed in claim 13, wherein said releasable fixing means comprises a plurality of elements formed on faces of the front walls and the outer edge of the or each top wall through which EL securing element or elements is passable.

15. A container as claimed in claim 1, wherein the base wall carries, on the face thereof opposed to said back wall a plurality of wheels.

16. A container as claimed in claim 15, wherein each side wall is provided with a handle by means of which the container may readily be moved.

* * * * *